(12) United States Patent
Koyama et al.

(10) Patent No.: US 10,302,045 B2
(45) Date of Patent: May 28, 2019

(54) HYDROGEN INJECTION APPARATUS

(71) Applicants: KEIHIN CORPORATION, Tokyo (JP); HONDA MOTOR CO., LTD., Tokyo (JP)

(72) Inventors: Tomoyoshi Koyama, Utsunomiya (JP); Tetsuya Fukuda, Wako (JP); Satoshi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 15/437,540

(22) Filed: Feb. 21, 2017

(65) Prior Publication Data

US 2017/0244118 A1    Aug. 24, 2017

(30) Foreign Application Priority Data

Feb. 24, 2016   (JP) ................. 2016-032638

(51) Int. Cl.
| | |
|---|---|
| *H01M 8/04082* | (2016.01) |
| *F02M 21/02* | (2006.01) |
| *H01M 8/04089* | (2016.01) |
| *F04F 5/16* | (2006.01) |
| *F04F 5/46* | (2006.01) |

(52) U.S. Cl.
CPC ............ *F02M 21/02* (2013.01); *F04F 5/16* (2013.01); *F04F 5/46* (2013.01); *H01M 8/04089* (2013.01); *H01M 8/04097* (2013.01)

(58) Field of Classification Search
None
See application file for complete search history.

(56) References Cited

U.S. PATENT DOCUMENTS

| | | | |
|---|---|---|---|
| 2009/0317691 A1 | 12/2009 | Yamada et al. | |
| 2012/0189927 A1* | 7/2012 | Kato | H01M 8/04097 429/415 |

FOREIGN PATENT DOCUMENTS

| | | |
|---|---|---|
| JP | 2008-196401 | 8/2008 |
| JP | 2010-267553 | 11/2010 |

OTHER PUBLICATIONS

U.S. Appl. No. 15/437,540, filed Feb. 21, 2017 is co-pending with U.S. Appl. No. 15/437,546, filed Feb. 21, 2017 and U.S. Appl. No. 15/437,550, filed Feb. 21, 2017.
U.S. Final Office Action dated Jan. 3, 2019 from co-pending U.S. Appl. No. 15/437,546, 7 pages.

* cited by examiner

*Primary Examiner* — Ladan Mohaddes
(74) *Attorney, Agent, or Firm* — Rankin, Hill & Clark LLP

(57) ABSTRACT

A hydrogen injection apparatus has an injector attached to an attachment hole of a body. The injector can inject hydrogen. A mounting member made of metal is provided on the outer circumferential side of the injector. An annular elastic member is provided in contact with a base of the mounting member. At the time of mounting the injector to the attachment hole, an elastic member and the mounting member are assembled in a manner that the elastic member and the mounting member are accommodated in a support base of an attachment provided at an opening of the attachment hole.

3 Claims, 4 Drawing Sheets

B ←→ A

HYDROGEN INJECTION APPARATUS

CROSS-REFERENCE TO RELATED APPLICATION

This application is based upon and claims the benefit of priority from Japanese Patent Application No. 2016-032638 filed on Feb. 24, 2016, the contents of which are incorporated herein by reference.

BACKGROUND OF THE INVENTION

Field of the Invention

The present invention relates to a hydrogen injection apparatus used in a fuel cell system, for injecting hydrogen.

Description of the Related Art

Conventionally, in fuel cell systems, fuel gas supply apparatuses for supplying a hydrogen gas to fuel cells have been used. For example, as disclosed in Japanese Laid-Open Patent Publication No. 2010-267553, the fuel gas supply apparatus has an injector for injecting hydrogen, and the injector is attached to a support base of a body having a fluid channel to flow the hydrogen gas. The hydrogen injected from a front end (distal end) of the injector flows through the fluid channel, and the hydrogen is supplied from a discharge port to the fuel cells through a diffuser provided in the fuel gas supply apparatus. Further, a sound proof member of metal or resin is fixedly provided and held between the injector and the support base to achieve reduction of vibrations and operation noises generated by the injector.

SUMMARY OF THE INVENTION

In the above described fuel gas supply apparatus, the sound proof member is made of metal or resin. However, for example, in the case where the sound proof member is made of metal, there is a concern that noises may be generated by the contact between the metal sound proof member and the metal support base, and the contact surface of the support base may be damaged or destroyed due to vibrations generated during operation of the injector. In the case where the sound proof member is made of resin, there is a concern that the mounting accuracy may not be good or may not be stable because the rigidity of the resin sound proof member is insufficient in comparison with the metal sound proof member. Further, the resin sound proof member needs to have a large size to compensate for the insufficient rigidity.

A general object of the present invention is to provide a hydrogen injection apparatus in which it is possible to suppress generation of noises and reduce the size of the hydrogen injection apparatus, and improve the mounting accuracy to a body.

A hydrogen injection apparatus according to the present invention includes a body including a fluid channel to flow hydrogen, an injector inserted into the fluid channel, and configured to inject the hydrogen, and a mounting member provided between a support base and the injector. The support base is provided for the body to face an opening of the fluid channel.

The mounting member comprises a base as a rigid body configured to contact an outer circumferential surface of the injector.

The base includes a contact portion configured to contact either the support base or a step between a large diameter portion and a small diameter portion in the outer circumferential surface, and a wall provided oppositely to the contact portion in an axial direction in a manner that the wall protrudes toward either the support base or the step which does not contact the contact portion.

An annular elastic member is provided in contact with a surface of the base opposite to the contact portion of the base, and in contact with either the support base or the step which does not contact the contact portion, an outer diameter of the wall is smaller than an outer diameter of the base, and an outer circumferential surface of the wall and an inner circumferential surface of the elastic member contact each other.

In the hydrogen injection apparatus of the present invention, a mounting member configured to mount an injector to a support base of a body is provided. The mounting member comprises a base as a rigid body. The base includes a contact portion configured to contact either the support base or a step between a large diameter portion and a small diameter portion in the outer circumferential surface, and a wall provided oppositely to the contact portion in an axial direction in a manner that the wall protrudes toward either the support base or the step which does not contact the contact portion, the outer diameter of the wall is smaller than the outer diameter of the base, and the outer circumferential surface of the wall and the inner circumferential surface of the elastic member contact each other. Further, the annular elastic member is provided in contact with a surface of the base opposite to the contact portion in an axial direction, and in contact with either the support base or the step which does not contact the contact portion.

Therefore, at the time of assembling the injector to the body, the mounting member as a rigid body is provided on the outer circumferential side of the injector. In the state where the mounting member contacts the outer circumferential surface of the injector, the contact portion of the mounting member is brought into contact with the step or the support base to attach the mounting member to the injector. In this manner, the injector can be fixedly positioned with respect to the body highly accurately. Accordingly, improvement in the mounting accuracy is achieved in comparison with the case of the conventional fuel gas supply apparatus. Further, in comparison with the conventional technique where the mounting member is made of resin, it is possible to maintain the strength, and achieve the size reduction.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
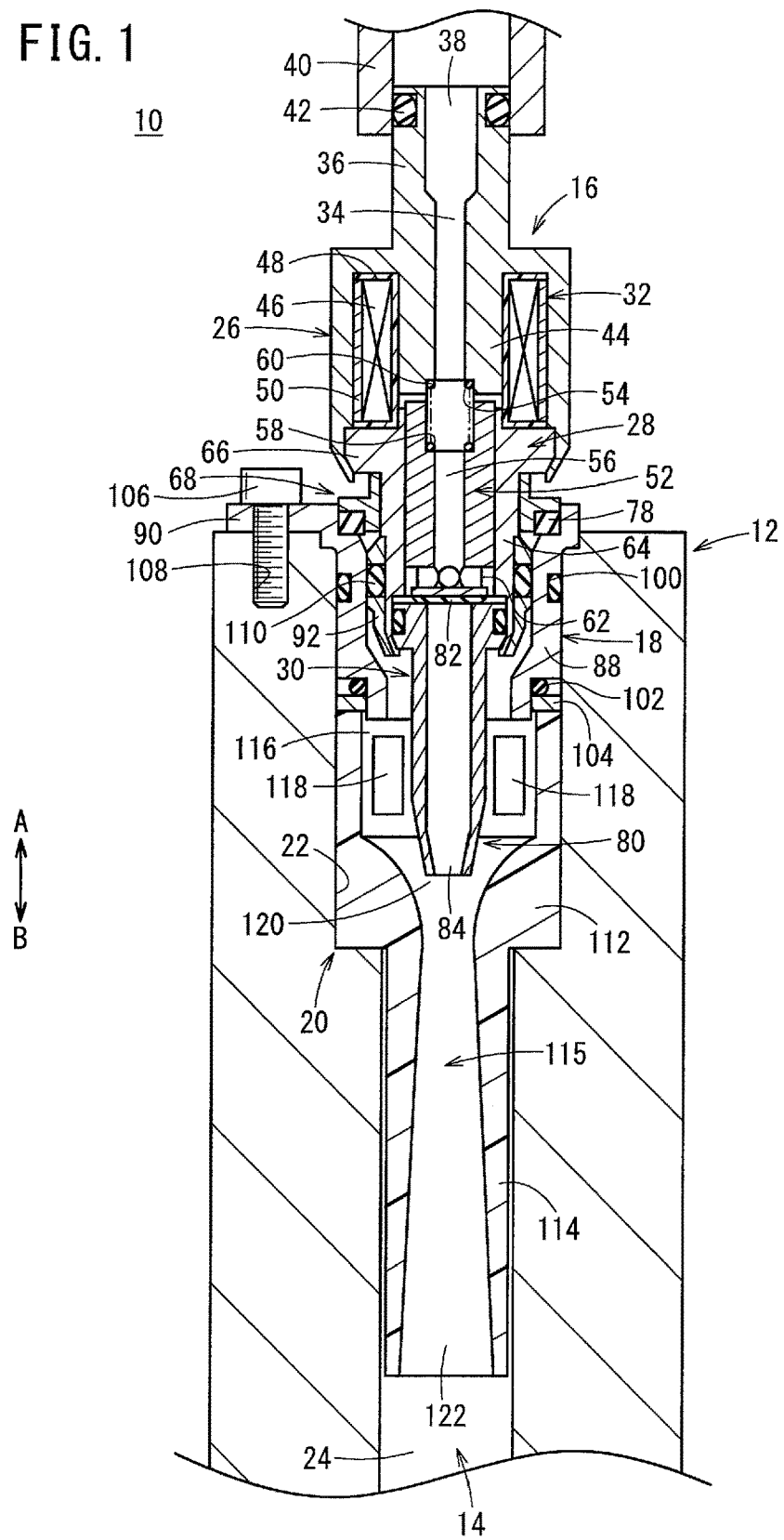
FIG. 1 is an overall cross sectional view showing a hydrogen injection apparatus according to an embodiment of the present invention.

As shown in FIG. 1, a hydrogen injection apparatus 10 includes an injector 16 provided at an attachment hole 14 of a body 12 for injecting hydrogen, an attachment 18 for fixing the injector 16 to the body 12, and a diffuser 20 for mixing the injected hydrogen with hydrogen discharged from a fuel cell stack (not shown). The attachment hole 14 functions as a fluid channel to flow the hydrogen.

Hereinafter, a side of the hydrogen injection apparatus 10 where the injector 16 is provided, indicated by an arrow A, will be referred to as the "proximal end side", and a side of the hydrogen injection apparatus 10 where the diffuser 20 is provided, indicated by an arrow B, will be referred to as the "distal end side".

The attachment hole 14 includes a first hole 22 having a large diameter formed on the proximal end side of the body 12 indicated by the arrow A and a second hole 24 having a diameter smaller than that of the first hole 22, and formed on the distal end side of the body 12 indicated by the arrow B. An end of the second hole 24 is connected to the fuel cell stack through a hydrogen supply pipe (not shown).

The injector 16 includes a housing 26, a valve holder 28 provided on the distal end side of the housing 26 in the direction indicated by the arrow B for guiding a movable core 52 described later, and a fuel injection part 30 provided on the distal end side of the valve holder 28, for injecting the hydrogen. A solenoid part 32 is provided inside the housing 26, for driving the movable core 52.

For example, the housing 26 is made of metal. A gas channel 34 passes through the center of the housing 26 in an axial direction of the housing 26. The gas channel 34 is connected to an inlet port 38 of a connector part 36 formed on the proximal end side in the direction indicated by the arrow A. A pipe 40 is connected to the connector part 36. A hydrogen tank (not shown) is connected to the pipe 40 for supplying the hydrogen to the pipe 40. An O-ring 42 is attached to an annular groove formed on the outer circumferential surface of the connector part 36. Then, when the pipe 40 is fitted on the outer circumferential side of the connector part 36, leakage of the hydrogen is prevented by the O-ring 42.

Further, the diameter of the housing 26 is increased toward the distal end side (in the direction indicated by the arrow B) from an intermediate position in the axial direction, and the solenoid part 32 is provided inside the housing 26 (large diameter portion).

The solenoid part 32 includes a fixed core 44 provided at its center in alignment with the connector part 36, a bobbin 48 provided on an outer circumferential side of the fixed core 44 for holding a coil 46, and a cover member 50 provided around the bobbin 48 to cover the outer circumference side of the bobbin 48. The coil 46 is excited to move the movable core 52 positioned to face the distal end of the fixed core 44.

Further, the gas channel 34 passes through the connector part 36, up to the distal end of the fixed core 44, and a first spring receiver 54 is formed at the distal end of the gas channel 34. The diameter of the first spring receiver 54 is increased toward the outside in the radial direction.

Figure 2:
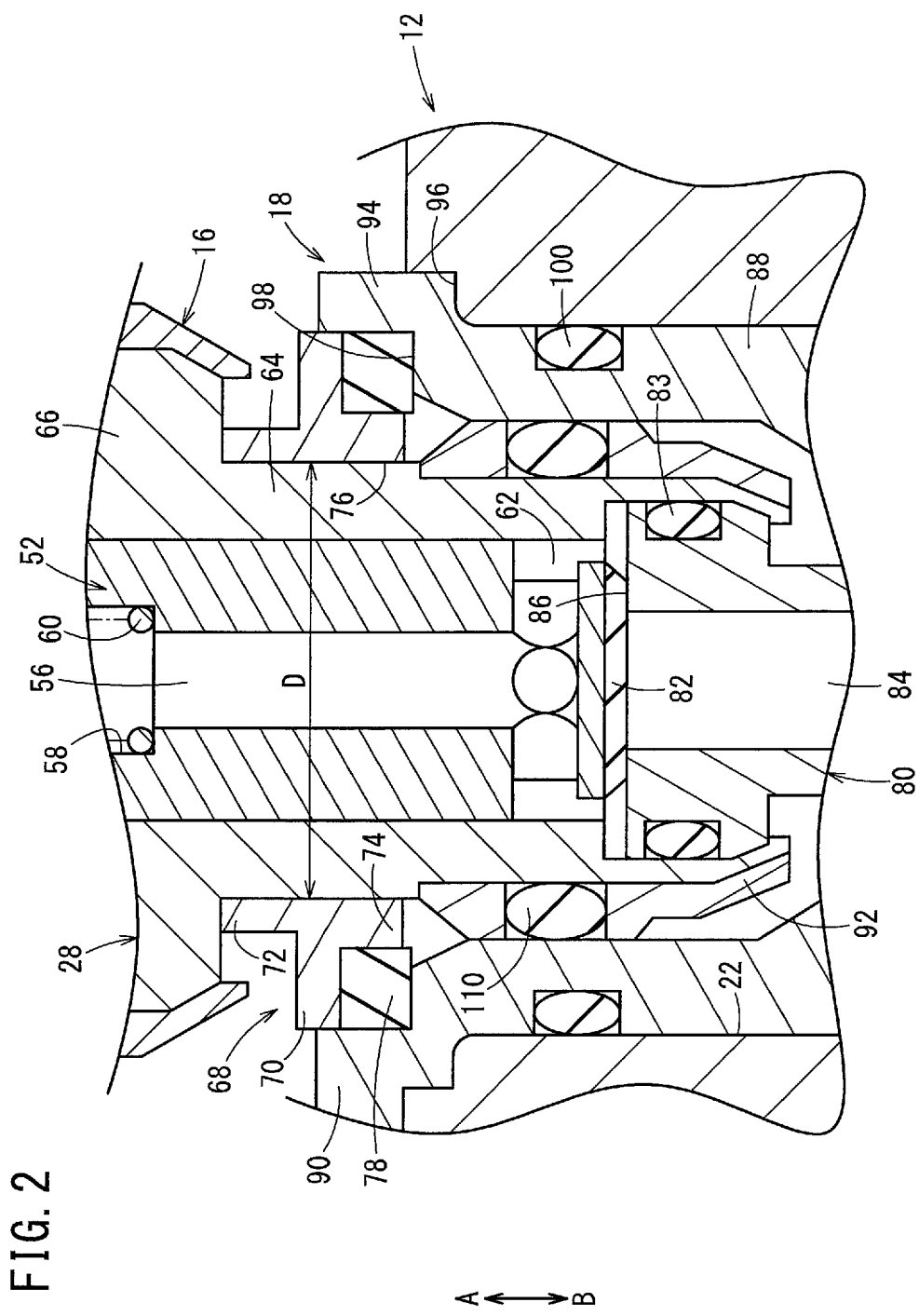
FIG. 2 is an enlarged cross sectional view showing an area near a mounting member of the hydrogen injection apparatus of FIG. 1.

As shown in FIGS. 1 and 2, for example, the movable core 52 is made of magnetic metal, and a passage hole 56 extends through the center of the movable core 52, from the proximal end to the distal end of the movable core 52. At the distal end in the direction indicated by the arrow B, the passage hole 56 is opened outward radially, and passes through the movable core 52 to the outer circumferential surface.

A second spring receiver 58 is formed at the proximal end side of the passage hole 56 in the direction indicated by the arrow A. The diameter of the second spring receiver 58 is increased toward the outside in the radial direction. A spring 60 is interposed between the first spring receiver 54 of the fixed core 44 and the second spring receiver 58 of the movable core 52. The first spring receiver 54 and the second spring receiver 58 are positioned oppositely. For example, this spring 60 is a coil spring. The spring 60 applies its elastic force to the movable core 52 in a direction away from the fixed core 44, indicated by the arrow B.

The hydrogen is supplied from the inlet port 38 of the housing 26 to the gas channel 34. After the hydrogen flows through the fixed core 44 to the passage hole 56 of the movable core 52, the hydrogen flows into a space 62 formed outside (or on the outer circumferential side of) the distal end of the movable core 52. The space 62 is formed by partially cutting the outer circumferential portion of the movable core 52.

Further, the movable core 52 is sucked to move toward the fixed core 44 in the direction indicated by the arrow A, in opposition to the elastic force of the spring 60 under excitation operation of the coil 46 of the solenoid part 32.

For example, the valve holder 28 is made of metal, and includes a cylindrical guide (small diameter portion) 64, a flange (step) 66 extending raidally outward at the proximal end of the guide 64. The movable core 52 is provided movably at the center of the guide 64. The movable core 52 is movable in the axial directions indicated by the arrows A and B.

Further, the end surface of the flange 66 of the valve holder 28 contacts the end of the bobbin 48 of the solenoid part 32. The proximal end of the valve holder 28 is inserted into the bobbin 48. In this state, the valve holder 28 and the bobbin 48 are tightened together by (caulking) the distal end of the housing 26 extending to the outer circumferential surface of the flange 66. In this manner, the valve holder 28 is fixedly positioned coaxially with the distal end of the housing 26.

Further, the distal end of the guide 64 and a nozzle 80 of the fuel injection part 30 are tightened together (by caulking) in a manner that the nozzle 80 of the fuel injection part 30 is fixed coaxially with the the guide 64.

A mounting member 68 is provided for the outer circumferential side of the valve holder 28 for fixing the injector 16 to the attachment 18 at the proximal end side adjacent to the flange 66 (in the direction indicated by the arrow A). As shown in FIGS. 1 to 4, the mounting member 68 is made of metal as a rigid body, and includes a base 70 having a C-shape in cross section, a first wall (another wall, contact portion) 72 oriented upright with respect to the base 70, and a second wall (wall) 74 oriented upright with respect to the base 70 in the direction indicated by the arrow B, oppositely to the first wall 72.

Figure 3A:
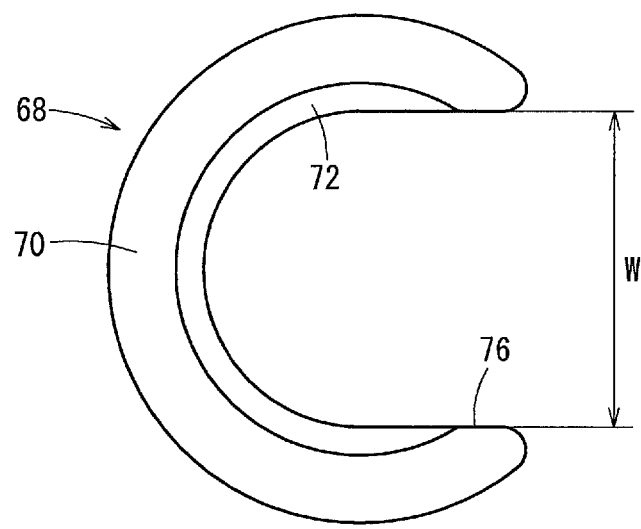
FIG. 3A is a plan view showing the mounting member.

As shown in FIG. 3A, the base 70 includes a cutout portion 76 cut out straight by a predetermined width from its circular outer circumferential surface toward the inside in the radial direction. The width W of the cutout portion 76 is substantially the same as the outer diameter D of the guide 64 of the valve holder 28 (see FIG. 2).

As shown in FIGS. 1 and 2, the first wall 72 is formed to protrude from one end surface of the base 70 in the axial direction indicated by the arrow A, and the end of the first wall 72 contacts the flange 66 of the valve holder 28.

Figure 3B:
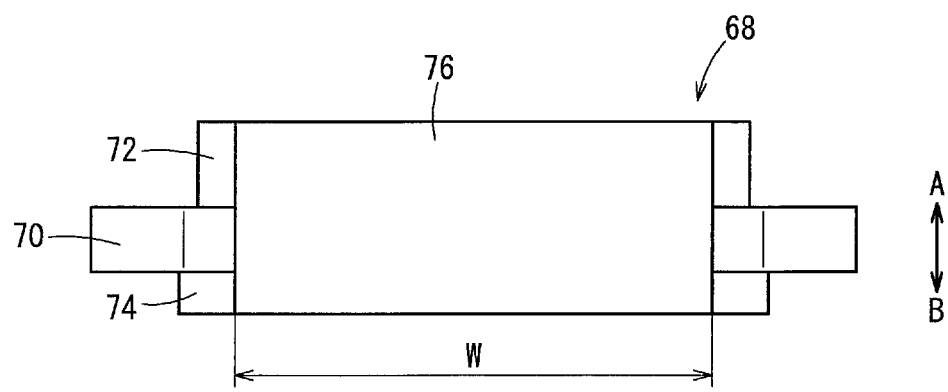
FIG. 3B is a front view showing the mounting member shown in FIG. 3A.

The second wall 74 protrudes from the other end surface of the base 70 in the axial direction indicated by the arrow B. Further, as shown in FIG. 3B, the thickness of the second wall 74 is increased outward in the radial direction. The second wall 74 is thicker than the first wall 72. It should be noted that all of the inner surfaces of the base 70, the first wall 72 and the second wall 74 are in the same plane surface.

Stated otherwise, as shown in FIG. 3B, the mounting member 68 is formed in a manner that the outer diameters of the first wall 72 and the second wall 74 are smaller than the outer diameter of the base 70.

Further, as shown in FIGS. 1 and 2, an annular elastic member 78 is provided on the outer circumferential side of the second wall 74 of the mounting member 68. For example, this elastic member 78 is made of rubber, etc., and has a rectangular shape in cross section. The elastic member 78 is fixedly position in the state where the inner circumferential surface of the elastic member 78 contacts the outer circumferential surface of the second wall 74, the proximal end surface of the elastic member 78 contacts the end surface of the base 70, and the end surface on the distal end side (in the direction indicated by the arrow B) slightly protrudes beyond the distal end of the second wall 74.

The fuel injection part 30 includes the nozzle 80 provided at the distal end of the valve holder 28, and a valve plug 82 provided at the distal end of the movable core 52 for switching the state of hydrogen supply through the nozzle 80.

For example, the nozzle 80 is made of metal, and has a cylindrical shape. The diameter of the proximal end of the nozzle 80 is increased, and the proximal end of the nozzle 80 is held by the valve holder 28. The proximal end of the nozzle 80 faces the distal end of the movable core 52.

An O-ring 83 (see FIG. 2) is provided through the annular groove formed at the proximal end, on the outer circumferential surface of the nozzle 80. A valve seat 86 is formed at an end surface of the nozzle 80 facing the movable core 52, at a position outside a nozzle hole 84 described later (see FIG. 2). The valve plug 82 is seated on the valve seat 86.

The distal end of the nozzle 80 is tapered, i.e., the diameter of the nozzle 80 is decreased gradually. The nozzle hole 84 passes through the center of the nozzle 80 in the axial direction indicated by the arrows A and B, and the diameter of the nozzle hole 84 is decreased gradually in a position adjacent to the distal end of the nozzle 80.

For example, the valve plug 82 is made of elastic material, and has a circular disk shape. The valve plug 82 is provided at the center of the distal end of the movable core 52 in a manner that the valve plug 82 and the movable core 52 move together in the axial directions. The valve plug 82 is seated on the valve seat 86 of the nozzle 80 to close the proximal end of the nozzle hole 84. Accordingly, the space 62 is disconnected from the nozzle hole 84.

For example, the attachment 18 is made of metal. The attachment 18 includes a cylindrical main body 88 and a flange 90 protruding outward from the proximal end of the main body 88 in the radial direction. The main body 88 is inserted into the attachment hole 14. The valve holder 28 and the nozzle 80 are partially provided inside the attachment 18 (main body 88) through a cap 92.

The main body 88 has a substantially constant outer diameter, and the main body 88 is inserted into the first hole 22 of the attachment hole 14 formed on the proximal end side of the body 12. An increased diameter portion 94 at the proximal end of the main body 88 is inserted into, and engaged with a step 96 formed at the proximal end of the first hole 22. In the structure, the attachment 18 is positioned with respect to the attachment hole 14 of the body 12 in the axial direction indicated by the arrow B. At this time, the increased diameter portion 94 is provided to protrude from the proximal end surface of the body 12 by a predetermined height.

Further, a support base 98 is formed in the increased diameter portion 94. The support base 98 is opened, and recessed on the proximal end side of the increased diameter portion 94. The elastic member 78 and the mounting member 68 are partially placed, and held inside the support base 98. The outer diameter of the support base 98 is substantially the same as the outer diameter of the base 70 of the mounting member 68.

That is, in the state where the inner circumferential surface of the mounting member 68 contacts the guide 64 of the valve holder 28, an end of the first wall 72 contacts the flange 66, and the elastic member 78 which contacts the base 70 is placed inside the support base 98 of the attachment 18. In this manner, the mounting member 68 is positioned fixedly.

An O-ring 100 is provided around an annular groove formed on the outer circumferential surface of the main body 88, and contacts the inner circumferential surface of the first hole 22. In the structure, leakage of the hydrogen through the space between the main body 88 and the first hole 22 is prevented.

Further, as shown in FIG. 1, the diameter at the distal end of the main body 88 is decreased stepwise, and tapered. An annular vibration absorption member 102 and a ring member 104 are arranged in the axial direction on the outer circumferential surface of the main body 88. For example, the vibration absorption member 102 is an O-ring made of elastic material. The vibration absorption member 102 is provided on the proximal end side in the direction indicated by the arrow A, for reducing transmission of vibrations generated during operation of the injector 16, to the body 12.

For example, the ring member 104 is made of metal, and provided on the distal end side of the vibration absorption member 102 in the direction indicated by the arrow B.

The flange 90 extends outward in the radial direction of the support base 98. In the state where the main body 88 is inserted into the attachment hole 14, the flange 90 contacts the proximal end surface of the body 12. Further, as shown in FIG. 1, a mounting screw 106 is inserted into a hole formed in the flange 90, and screwed into a screw hole 108 formed at the proximal end of the body 12 to fix the attachment 18 including the flange 90 to the body 12.

In the same manner as in the case of the attachment 18, the cap 92 has a cylindrical shape. The diameter of the cap 92 is decreased at its distal end. The cap 92 covers the outer circumferential side at the distal end of the guide 64 in the valve holder 28. By an O-ring 110 provided on the outer circumferential surface of the guide 64, leakage of the hydrogen through the space between the guide 64 and the attachment 18 is prevented.

The diffuser 20 is provided in the attachment hole 14 of the body 12, on the distal end side of the injector 16 in the direction indicated by the arrow B. The diffuser 20 includes a large diameter portion 112 accommodated in the first hole 22 of the attachment hole 14, and a small diameter portion 114 formed on the distal end side of the large diameter portion 112. The diameter of the small diameter portion 114 is smaller than the diameter of the large diameter portion 112. The small diameter portion 114 is accommodated inside the second hole 24 of the attachment hole 14.

Further, the outer circumferential surfaces of the large diameter portion 112 and the small diameter portion 114 of the diffuser 20 contact the circumferential walls of the first hole 22 and the second hole 24, respectively, and the border between the large diameter portion 112 and the small diameter portion 114 is engaged with the step at the border between the first hole 22 and the second hole 24. In this manner, the diffuser 20 is positioned fixedly.

Further, a diffuser channel 115 is formed inside the diffuser 20. The diffuser channel 115 extends in the axial direction of the diffuser 20. Further, the diffuser channel 115 includes a chamber 116 formed inside the large diameter portion 112. In the chamber 116, the redundant hydrogen which has not been consumed in the fuel cell stack is circulated again. The chamber 116 has a substantially constant diameter. The chamber 116 is connected to a circulation channel of the body 12 through a plurality of connection channels 118. The connection channels 118 have substantially the same diameter, and pass through the outer wall of the large diameter portion 112 in the radial direction. It should be noted that the circulation channel is connected to the fuel cell stack (not shown), and the redundant hydrogen which has not consumed in the fuel cell stack is discharged from the fuel cell stack, and circulated in the circulation channel.

This diffuser channel 115 includes a reduced diameter portion 120 and a diffuser support 122. The reduced diameter portion 120 is formed on the distal end side of the chamber 116, i.e., on the small diameter portion 114 side, and the inner diameter of the reduced diameter portion 120 is reduced sharply. The diffuser support 122 is formed downstream of the reduced diameter portion 120, and extends in the axial direction.

The diffuser support 122 is formed inside the small diameter portion 114, and the diameter of the diffuser support 122 is increased gradually toward its distal end. That is, the distal end side of the diffuser support 122 has the largest diameter. Further, the diffuser support 122 is connected to the second hole 24 at the distal end of the diffuser 20.

The hydrogen injection apparatus 10 according to the embodiment of the present invention basically has the structure as described above. Next, with reference to FIG. 4, an explanation will be given in connection with a case where the mounting member 68 and the elastic member 78 are assembled to the valve holder 28 of the injector 16. The following explanation is based on the premise that the housing 26 has already been attached to the proximal end of the valve holder 28.

Figure 4:
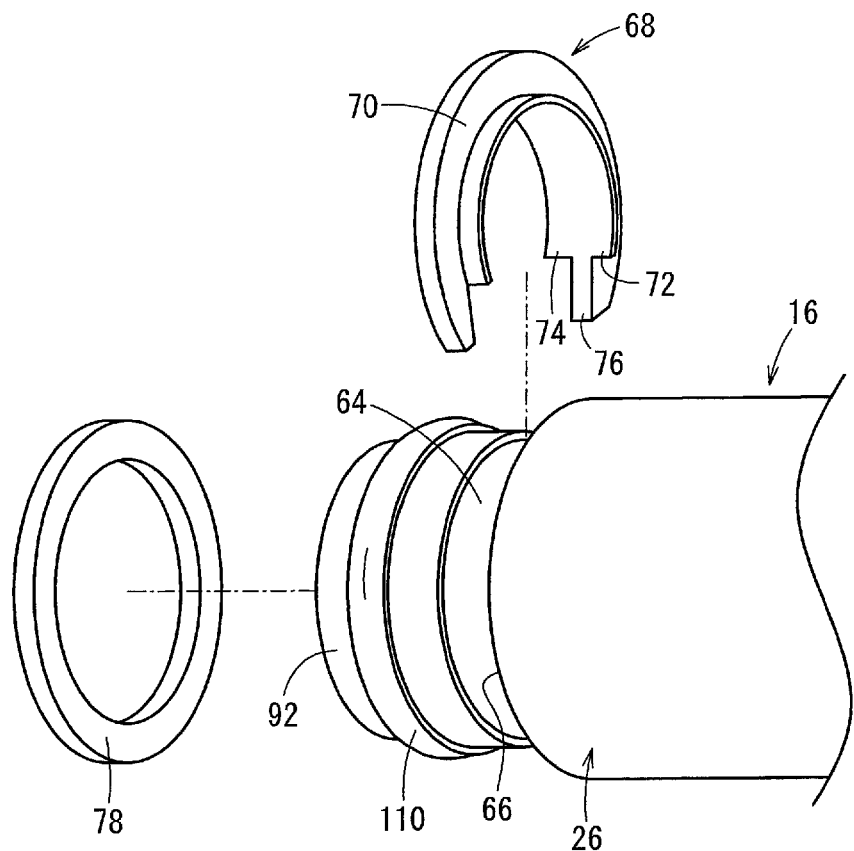
FIG. 4 is an exploded perspective view showing a state before assembling the mounting member and an elastic member to a distal end of an injector.

Firstly, as shown in FIG. 4, the mounting member 68 is provided on one side of the guide 64 of the valve holder 28 such that the cutout portion 76 is oriented toward the valve holder 28. The cutout portion 76 is externally fitted to the guide 64 from a direction perpendicular to the axial line of the valve holder 28. At this time, the width W of the cutout portion 76 (see FIG. 3A) is substantially the same as the outer diameter D of the guide 64 (see FIG. 2). Therefore, the inner circumferential surface of the cutout portion 76 contacts the outer circumferential surface of the guide 64.

Next, after the first wall 72 of the mounting member 68 is brought into contact the flange 66 of the valve holder 28, the elastic member 78 is moved from the distal end to the proximal end of the guide 64 (in the direction indicated by the arrow A) in a manner that the distal end (having a reduced diameter) of the guide 64 is inserted into the elastic member 78 until the elastic member 78 reaches a position where the elastic member 78 contacts the base 70 of the mounting member 68. The inner diameter of the elastic member 78 and the outer diameter of the second wall 74 are substantially the same. Therefore, the elastic member 78 is positioned fixedly in the state where the inner circumferential surface of the elastic member 78 contacts the outer circumferential surface of the second wall 74, and the proximal end surface of the elastic member 78 contacts the end surface of the base 70. Therefore, the mounting member 68 is fixed coaxially with the valve holder 28.

Then, as shown in FIG. 2, after the mounting member 68 and the elastic member 78 are assembled with the injector 16, the injector 16 is inserted into the attachment 18 attached to the body 12, and the mounting member 68 and the elastic member 78 are accommodated inside the support base 98. Consequently, the injector 16 is positioned coaxially with the attachment 18.

As described above, at the time of assembling the injector 16 to the attachment hole 14 of the body 12, the mounting member 68 which is made of metal, and has a C-shape in cross section is provided on the outer circumferential side of the valve holder 28. By inserting the mounting member 68 into the support base 98 of the attachment 18 provided at the opening of the attachment hole 14, it becomes possible to fixedly position the injector 16 to the attachment hole 14 of the body 12 through the rigid metal mounting member 68 with a high degree of accuracy.

Further since the mounting member 68 is made of metal as a rigid body, in comparison with the case where the mounting member 68 is made of resin, it is possible to maintain the desired strength, and achieve size reduction.

Further, since the elastic member 78 made of elastic material is provided between the base 70 of the mounting member 68 and the support base 98 of the attachment 18, it is possible to suitably absorb noises, vibrations, etc. generated during operation of the injector 16, and suppress transmission of the noises, vibrations, etc. to the body 12. In this manner, it is possible to improve the sound proof performance of the hydrogen injection apparatus 10. Further, since it is sufficient to insert the injector 16 into the annular elastic member 78, from the distal end of the injector 16, the assembling operation can be performed easily. Improvement in the efficiency of the assembling operation is achieved.

Further, the mounting member 68 has the cutout portion 76 opened to one side. The mounting member 68 can be assembled simply by externally fitting the mounting member 68 to one lateral side of the valve holder 28 of the injector 16 through the cutout portion 76. Therefore, improvement in the efficiency of the assembling operation is achieved.

Moreover, the mounting member 68 has the second wall 74 extending on the distal end side of the base 70 in the axial direction of the injector 16. Therefore, by bringing not only the base 70 but also the inner surface of the second wall 74 into contact with the injector 16, it is possible to reliably and stably fix the injector 16 to the body 12. Further, since the mounting member 68 has the first wall 72 extending in a direction opposite to the second wall 74, in comparison with the case where only the second wall 74 is provided, it becomes possible to hold the injector 16 further accurately and stably.

Further, in the mounting member 68, the outer diameter of the second wall 74 is smaller than the outer diameter of the base 70. Therefore, by bringing the elastic member 78 into contact with the base 70 and the second wall 74, it becomes possible to attach, and position the elastic member 78 to the mounting member 68 easily and reliably. Stated otherwise, no positional displacement between the elastic member 78 and the mounting member 68 occurs.

Next, operation of the hydrogen injection apparatus 10 to which components such as the mounting member 68 are assembled as mentioned above will be described briefly. The following explanation is based on the premise that that hydrogen has been supplied to the injector 16 of the hydrogen injection apparatus 10 beforehand through the pipe 40, and the hydrogen has been supplied to the space 62 through the gas channel 34 of the housing 26, and the passage hole 56 of the movable core 52.

Firstly, the coil 46 of the solenoid part 32 is energized based on a control signal from an electronic control unit (not shown). By excitation of the coil 46, the movable core 52 is attracted toward the fixed core 44 (in the direction indicated by the arrow A), to compress, and move the spring 60. Consequently, the valve plug 82 is spaced from the valve seat 86. That is, the valve is opened.

As a result, the hydrogen supplied to the gas channel 34 of the housing 26 flows from the space 62 to the opened nozzle hole 84 of the nozzle 80. Thereafter, the hydrogen passes through the diffuser 20, and the hydrogen is injected toward the fuel cell stack (not shown) through the second hole 24.

Then, the redundant hydrogen (hydrogen which was supplied to the fuel cell stack, but which was discharged from the fuel cell stack as the off gas without being electrolyzed in the fuel cell stack) is sucked from the connection channels 118 into the chamber 116 through the circulation channel (not shown) of the body 12 by the negative pressure which is generated when the hydrogen injected from the injector 16 passes through the diffuser 20, mixed with hydrogen flowing through the diffuser 20, and then, supplied again to the fuel cell stack.

In the case where supply of the hydrogen to the fuel cell stack (not shown) is sufficient, based on the control signal from the electric control unit, energization of the solenoid part 32 is stopped. As a result, the attracting force to move the movable core 52 toward the fixed core 44 (in the direction indicated by the arrow A) is lost, and the movable core 52 is biased toward the valve seat 86 (in the direction indicated by the arrow B) by the elastic force of the spring 60. Consequently, the valve plug 82 is seated on the valve seat 86, and the valve is closed. Thus, flow of the hydrogen toward the nozzle 80 is disconnected, and supply of the hydrogen to the fuel cell stack is stopped.

Further, the first wall 72 of the mounting member 68 as the contact portion contacts the flange 66 of the valve holder 28, and the elastic member 78 provided oppositely to the first wall 72 contacts the support base 98 of the attachment 18. However, the present invention is not limited. For example, the elastic member 78 may be sandwiched between the base 70 of the mounting member 68 and the flange 66, and the second wall 74 formed on the opposite side may be brought into contact with the support base 98.

Moreover, the base 70 may be directly brought into surface to surface contact with the flange 66 without providing the first wall 72 for the mounting member 68. Also in this case, the injector 16 can be positioned highly accurately on the body 12 through the attachment 18 to which the mounting member 68 is inserted.

Further, the present invention is not limited to the case where the mounting member 68 is attached to the support base 98 of the attachment 18. For example, the mounting member 68 may be attached to the support base which is formed directly on the body 12.

The hydrogen injection apparatus according to the present invention is not limited to the above described embodiment. It is a matter of course that various structures can be adopted without deviating from the gist of the present invention.

What is claimed is:

1. A hydrogen injection apparatus comprising:
a body including a fluid channel to flow hydrogen;
an injector inserted into the fluid channel, and configured to inject the hydrogen;
a mounting member provided between a support base and the injector, the support base being provided for the body to face an opening of the fluid channel; and
the mounting member comprising a base as a rigid body configured to contact an outer circumferential surface of the injector,
wherein the base includes:
a contact portion configured to contact either the support base or a step between a large diameter portion and a small diameter portion in the outer circumferential surface; and
a wall provided oppositely to the contact portion in an axial direction in a manner that the wall protrudes toward either the support base or the step which does not contact the contact portion,
wherein an annular elastic member is provided in contact with a surface of the base opposite to the contact portion of the base in the axial direction, and in contact with either the support base or the step which does not contact the contact portion;
an outer diameter of the wall is smaller than an outer diameter of the base, and an outer circumferential surface of the wall and an inner circumferential surface of the elastic member contact each other;
the base includes a cutout portion with a cutout in a radial direction; and
a width of the cutout portion is smaller than an outer diameter of the large diameter portion, and larger than an outer diameter of the small diameter portion.

2. The hydrogen injection apparatus according to claim 1, wherein the contact portion comprises another wall protruding from the base in a direction opposite to a direction that the wall protrudes from the base.

3. The hydrogen injection apparatus according to claim 1, wherein the contact portion is formed in a planar shape.

* * * * *